(12) United States Patent
Crockett et al.

(10) Patent No.: US 6,260,129 B1
(45) Date of Patent: Jul. 10, 2001

(54) MANAGEMENT OF FIXED PAGES IN MEMORY FOR INPUT/OUTPUT OPERATIONS

(75) Inventors: Robert Nelson Crockett; Ronald Maynard Kern; Gregory Edward McBride; David Michael Shackelford; Stephen Charles West, all of Tucson, AZ (US)

(73) Assignee: International Business Machines Corportion, Armonk, NY (US)

( * ) Notice: Subject to any disclaimer, the term of this patent is extended or adjusted under 35 U.S.C. 154(b) by 0 days.

(21) Appl. No.: 09/149,052

(22) Filed: Sep. 8, 1998

(51) Int. Cl.[7] ............................................... G06F 12/00
(52) U.S. Cl. ........................ 711/170; 711/171; 710/52; 710/56
(58) Field of Search .................................. 711/165, 171, 711/170; 710/56, 52, 22, 30; 709/230, 232, 213

(56) References Cited

PUBLICATIONS

Fixed Storage Allocation of Input–Output Buffers, IBM Technical Disclosure Bulletin, vol. 39, No. 3, Mar. 1996.*

Remote Copy Administrator's Guide and Reference, DFSMS/MVS Version 1, Third Edition, Jul. 1996, IBM Doc. No. SC35–0169–02.*

\* cited by examiner

*Primary Examiner*—Do Hyun Yoo
*Assistant Examiner*—Yamir Encarnación
(74) *Attorney, Agent, or Firm*—David W. Victor, Esq.; Konrad Raynes & Vic

(57) ABSTRACT

Disclosed is a system for managing pages in a volatile memory device for data transfer operations between a first storage area and a second storage area. The first storage area is queried to determine a number of data sets to include in a data transfer operation. A number of pages in the volatile memory device needed for the data transfer operation is then determined. A determination is then made as to whether the number of pages needed for the data transfer operation is greater than available fixed pages in a pool of pages. Available fixed pages in the pool are allocated to the data transfer operation after determining that the number of pages needed to process the data transfer operation is less than or equal to the available fixed pages in the pool. Alternatively, after determining that the number of pages needed to process the data transfer operation is greater than the available fixed pages in the pool, all the fixed pages in the pool and additional fixed pages are allocated to the data transfer operation.

34 Claims, 4 Drawing Sheets

MANAGEMENT OF FIXED PAGES IN MEMORY FOR INPUT/OUTPUT OPERATIONS

FIELD OF THE INVENTION

The present invention relates to a method and system for managing pages fixed in volatile memory that are used in data transfer, i.e., input/output, operations.

BACKGROUND OF THE RELATED ART

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These XRC and PPRC systems are described in IBM publication "Remote Copy: Administrator's Guide and Reference," IBM document No. SC35-0169-02(IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In data transfer operations, such as XRC, storage buffers in the host system's volatile memory, e.g., DRAM, are used to buffer data transferred from the primary storage controller to the secondary storage controller. A buffer is comprised of multiple pages in the host system's memory. Such pages in a buffer are fixed for the read operation from the primary storage controller, freed after the read operation, then fixed again for the write operation to the secondary storage controller, and freed after the completion of the write operation. A fixed page cannot be swapped out of the volatile memory (DRAM) to disk storage. Fixed pages are, thus, not available to the operating system for other operations. The number of storage or page buffers of memory consumed are a function of the number of volumes involved in the copy operation. For instance, the current version of the IBM XRC product requires a minimum of 50 MB of virtual storage to support a single primary storage controller. The host system must set aside sufficient paging space in volatile memory areas for data copy operations between the controllers.

With current systems, the host system queries the primary controller to determine the size of the data transfer and then fixes pages in volatile memory to form buffers which are the targets of the data transfer operations. After a read or write operation, the pages fixed in the buffers are freed. This process, which includes fixing and freeing the pages for each data transfer, is expensive in terms of consuming host processor cycles and processing time. Certain prior art systems retain a few fixed pages within a buffer which are not freed after the read and write operations. In this way, a few of the pages in a buffer remain fixed and do not need to be fixed and freed for each input/output (I/O) operation. However, the pages in a buffer which do not remain permanently fixed float between being fixed during the read and write operations and being not fixed after the completion of such operation. These "floating" pages, which are fixed and freed for each I/O operation through the host system consume system resources to perform such fixing and freeing. This system of leaving only a couple of the pages in a buffer fixed across input/output operations is described in "Fixed Storage Allocation of Input-Output Buffers," IBM Technical Disclosure Bulletin, Vol. 39, No. 03(Mar. 1996).

Thus, there is a need in the art for an improved system for making pages in memory available for data transfer operations.

SUMMARY OF THE INVENTION

To address the shortcomings in the prior art described above, preferred embodiments of the present invention provide a system for managing pages in a volatile memory device for data transfer operations between a first storage area and a second storage area. The storage area is queried to determine a number of data sets to include in a data transfer operation. A number of pages in the volatile memory device needed for the data transfer operation is then determined. A determination is then made as to whether the number of pages needed for the data transfer operation is greater than available fixed pages in a pool of pages. Available fixed pages in the pool are allocated to the data transfer operation after determining that the number of pages needed to process the data transfer operation is less than or equal to the available fixed pages in the pool. Alternatively, after determining that the number of pages needed to process the data transfer operation is greater than the available fixed pages in the pool, all the fixed pages in the pool and additional fixed pages are allocated to the data transfer operation.

In further embodiments, the data sets are read from the first storage area to the fixed pages allocated to the data transfer operation. The data sets are then written from the fixed pages to the storage area. The fixed pages are allocated to the pool including available fixed pages after writing the data sets to the second storage area.

In yet further embodiments, an upper threshold of fixed pages available for data transfer operations is set. When the fixed pages are allocated to the pool, a determination is made as to whether the number of fixed pages available for data transfer operations exceeds the upper threshold. Fixed pages available in the pool are freed after determining that the number of fixed pages available for data transfer operations exceeds the upper threshold.

Preferred embodiments of the present invention provide a system and method for maintaining a pool of fixed pages available for data transfer operations, i.e., I/O operations, without having to fix and free pages after each input or output operation. In preferred embodiments, the number of fixed pages available for I/O operations is maintained at a threshold level to avoid tying-up too many pages that cannot otherwise be utilized by the operating system. Preferred embodiments further provide mechanisms for adjusting the number of fixed pages available for I/O operations as the I/O workload fluctuates.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
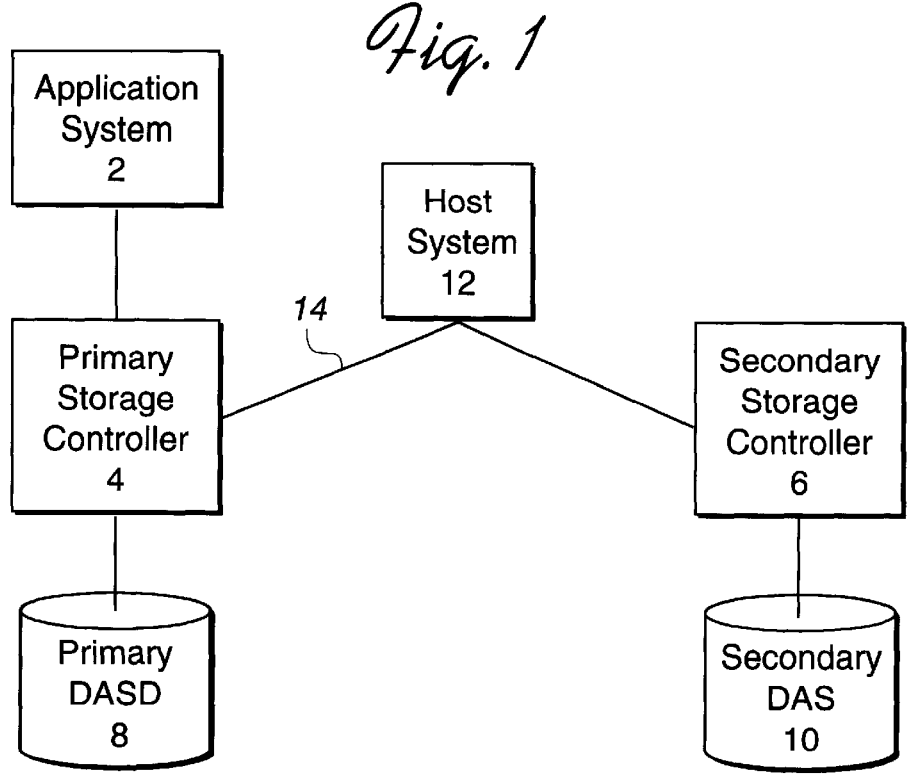
FIG. 1 is a block diagram illustrating a software and hardware environment in which preferred embodiments of the present invention are implemented.

FIG. 1 illustrates the hardware and software environment in which preferred embodiments of the present invention are implemented. Preferred embodiments include an application system 2, a primary 4 and secondary 6 storage controllers, a primary 8 and secondary 10 direct access storage devices (DASD), and a host system 12. Communication lines 14 provide communication between the host system 12 and the primary 4 and secondary 6 storage controllers.

Storage is maintained at two sites, a primary site and a secondary site. The primary site may include the application system 2, the primary storage controller 4, and the primary DASD 8. The secondary site may include the secondary storage controller 6 and the secondary DASD 10. The host system 12 may be at the secondary or primary site, or an alternative geographical location. In certain embodiments, the primary and secondary sites could be separated by considerable distances, such as several miles.

At the primary site, the application system 2, such as a database program or any other application program, writes data to the primary DASD 8. In preferred embodiments, the application system 2 includes a sysplex timer to provide a time stamp to any data writes the application system 2 sends to the primary storage controller 4. A backup copy of certain volumes in the primary DASD 8 is maintained in the secondary DASD 10. Volumes in the primary DASD 8 being shadowed in the secondary DASD 10 are referred to as "volume pairs." The secondary DASD 10 may provide a shadow copy of the data for data recovery purposes.

The primary 4 and secondary 6 controllers control access to the primary 8 and secondary 10 DASDs, respectively. In the embodiment of FIG. 1, data is transferred from the primary DASD 8, to the primary controller 4, to the host system 12, then to the secondary DASD 10 via the secondary controller 6. In this preferred mode of data transfer, data is transferred between controllers 4, 6 through the host system 12 address space. The primary 4 and secondary 6 storage controllers may be any suitable storage subsystem controller known in the art, such as the IBM 3990 Model 6 storage controller. The host system 12 may be any suitable computer system known in the art, such as a mainframe, desktop, workstation, etc., including an operating system such as WINDOWS®, AIX®, UNIX®, MVS™, etc. AIX is a registered trademark of IBM; MVS is a trademark of IBM; WINDOWS is a registered trademark of Microsoft Corporation; and UNIX is a registered trademark licensed by the X/Open Company LTD. The communication lines 14 may be comprised of any suitable network technology known in the art, such as LAN, WAN, SNA networks, TCP/IP, the Internet, etc. Alternatively, the communication line may be comprised of ESCON® technology. ESCON is a registered trademark of IBM.

In preferred embodiments, the host system 12 includes software to automatically read information on data writes to the primary DASD 8 by the application system 2 and transfer the data writes to the secondary DASD 10 for those volume pairs being shadowed at the secondary site. As mentioned, the host system 12 may include software including the functionality of data mover software included in storage management programs known in the art that manage the transfer of data between storage systems. Such data movement software is implemented in the IBM DFSMS software and XRC components implemented in the IBM MVS operating system. In addition to including data mover logic known in the art, the software in the host system 12 would further include additional program instructions and logic to perform the operations of the preferred embodiments of the present invention. The data mover software may be implemented within the operating system of the host systems 12 or as separate, installed application programs.

Figure 2:
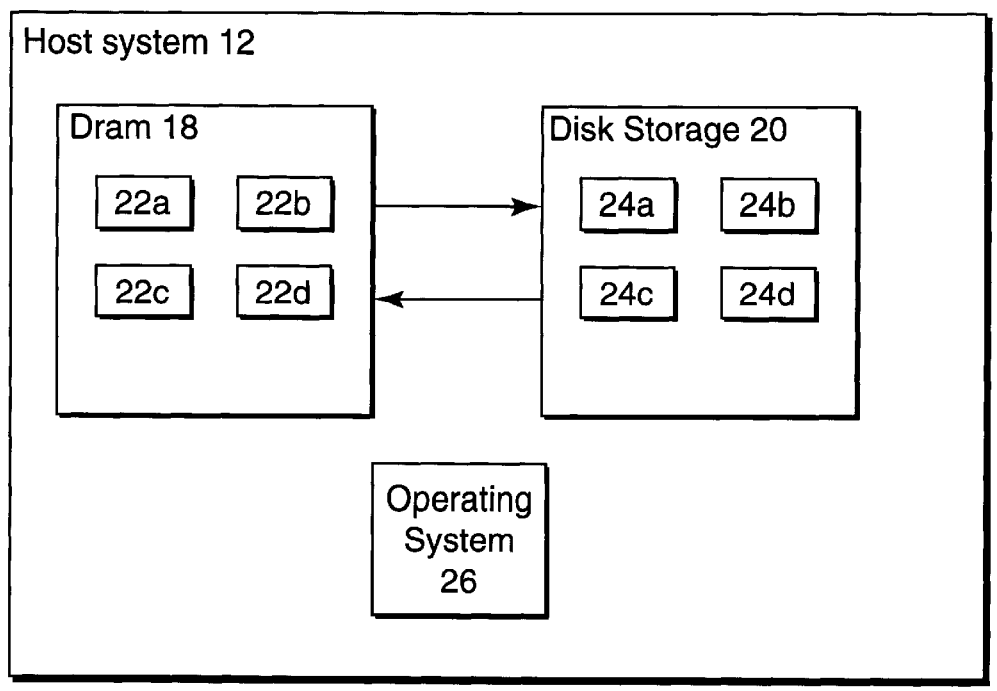
FIG. 2 is a block diagram illustrating the environment within a host system in which preferred embodiments of the present invention are implemented.

FIG. 2 illustrates the host system 12. The host system 12 includes a DRAM 18, or any other suitable volatile memory device known in the art, to temporarily store data. A non-volatile storage device, such as disk storage 20, provides more permanent storage of data. Pages 22a, b, c, d in the DRAM 18 may be swapped into the storage device 20. In this way, the DRAM 18 may provide virtual addressing for address space greater than the actual physical storage space in the DRAM 18 using virtual addressing techniques known in the art. Pages 24a, b, c, d in the disk storage 20 illustrate pages swapped from the DRAM 18 that reside in the disk storage 20. The host system 12 includes an operating system 26, e.g., MVS, which manages the pages in the DRAM 12 used for various operations, including I/O operations, such as copying data from the primary storage controller 4 to the secondary storage controller 6.

In preferred embodiments, page space 22a, b, c, d in the DRAM 18 is set aside to handle I/O copy operations between the controllers 4, 6. The host system 12 reads data from the primary controller 4 into the pages 22a, b, c, d in the DRAM 18 and then writes the data from these pages 22a, b, c, d to the secondary storage controller 6. In this way, pages and the address space for such pages 22a, b, c, d in the DRAM 18 are set aside for data copy operations between the controllers 4, 6.

In performing I/O operations, the operating system 26 must translate virtual addresses to physical addresses in the DRAM 18. When fixing pages in the DRAM 18, the operating system 26 dedicates those fixed pages to I/O operations. Such fixed pages cannot be used for any other applications. The fixed pages cannot be swapped between DRAM 18 and the disk storage 20. In preferred embodiments, pages remain fixed throughout read and write operations as data is read from the primary storage controller 4 and written to the secondary storage controller 6. By keeping the pages fixed throughout the read and write operations, the physical address of the data in the DRAM 18 remains the same throughout the copy operation. Thus, in preferred embodiments, the virtual to real address mapping remains the same for the reading of data in and the writing of data out because the real addresses of the pages 22a, b, c, d remains fixed in the DRAM 18.

Management of Pages Used In I/O Operations

Figure 3A:
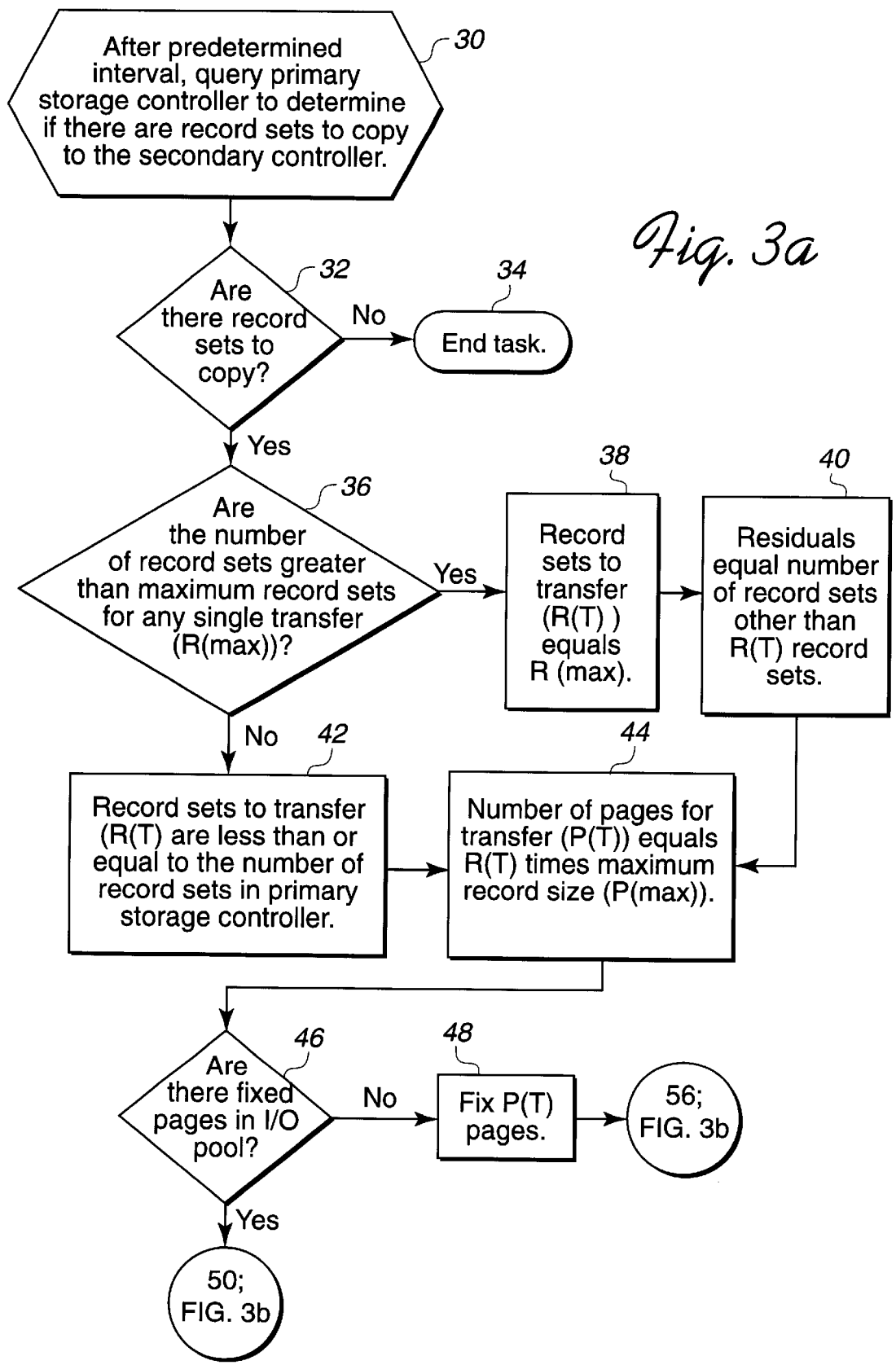
FIGS. 3a, b are flowcharts illustrating logic to copy data from the primary controller to the secondary storage controller in accordance with preferred embodiments of the present invention.

FIGS. 3a, b illustrate logic implemented in the operating system 26 of the host system 12 to set aside pages of the DRAM 18 to handle I/O operations between the primary 4 and secondary 6 storage controllers. Prior to executing the logic of FIGS. 3a, b, the host system 12 determines an upper threshold on the maximum amount of fixed pages in volatile memory, e.g., DRAM 18, that may be set aside for I/O operations. This upper threshold places a ceiling on the amount of DRAM 18 resources I/O operations will consume. This threshold may be provided by an operator or set by default in the operating system 26. If the operator provides the upper threshold in actual storage units, e.g., megabytes, gigabytes, etc., the host system 12 would determine the maximum number of pages in the DRAM 18 that comprise the upper threshold based on the value provided. For instance, if a page is comprised of 4 K, then the maximum number of pages to use for I/O operations would be the operator provided threshold divided by 4 K.

In preferred embodiments, when the primary storage controller 4 writes data updates to the primary DASD 8, the primary storage controller 4 maintains a copy of the data updates in cache. The host system 12 transfers this cached copy to the secondary storage controller. The data updates may be maintained in data record sets which include the data updates and various control information and metadata related to the update. To determine how many pages in the DRAM 18 are needed to transfer record sets, the host system 12 maintains a value indicating the pages need to transfer the largest possible record set. For instance, the number of pages needed to transfer the largest record set ($P_{max}$) may be comprised of 8 pages, or one-half a track. The host system 12 may then use this value $P_{max}$ as the number of pages needed to handle each record set to insure there is sufficient page space for any given record set. The host system 12 further maintains a maximum number of record sets to transfer at a time ($R_{max}$). This means that the host system 12 will read no more than $R_{max}$ record sets from the primary storage controller 4 for transfer to the secondary storage controller 6 for any given set of read write operations. Any additional record sets in the cache of the primary storage controller 4 will be read and written in subsequent operations. This means that the maximum number of pages in DRAM 18 needed to process an I/O operation between controllers 4, 6 would equal $P_{max}*R_{max}$. For purposes of illustration, $P_{max}$, the maximum size of a record set is 8 pages and no more than 64 record sets can be transferred at once, i. e., $R_{max}=64$.

Figure 3B:
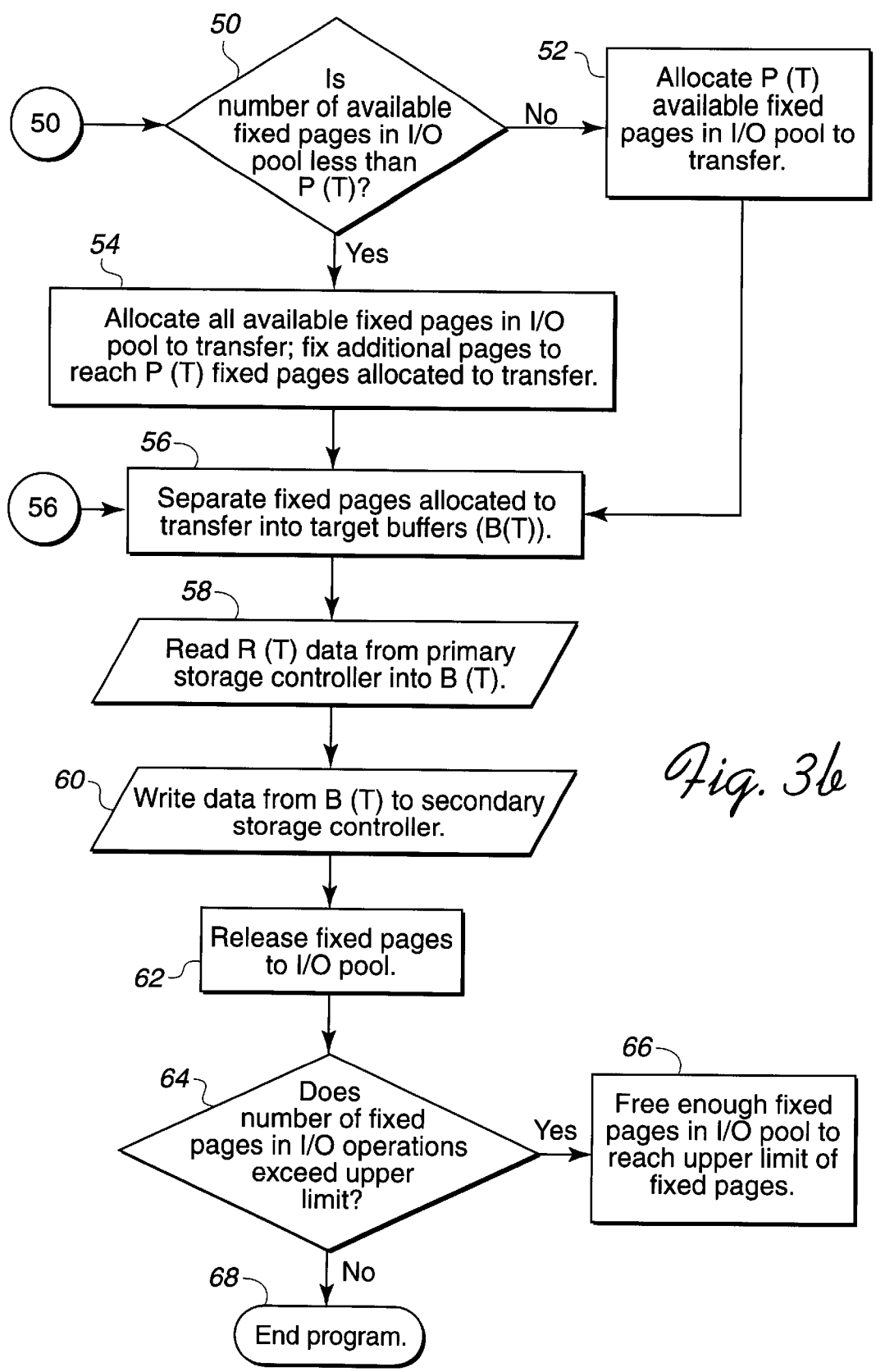

With reference to FIGS. 3a, b, control begins at block 30 which represents the host system 12 querying the primary storage controller 4 at predetermined intervals to determine if any data writes are maintained in the primary storage controller 4 cache. In preferred embodiments, the host system 12 operating system 26 may execute multiple instances, e. g., threads, of the logic of FIGS. 3a, 3b. A separate task of the logic of FIGS. 3a, 3b may be executed at the predetermined intervals. Accordingly, the operating system 26 allows for multi-tasking. Control transfers to block 32 which represents the host system 12 determining whether the query indicated that there were record sets in the primary storage controller 4 cache to copy to the secondary storage controller 6. If there are no record sets to copy, control transfers to block 34 which represents termination of the particular instance initiated at block 30. However, other instances of the logic of FIG. 3a, 3b previously initiated may be continuing. If there are record sets in the primary storage controller 4 cache, then control transfers to block 36 which represents the operating system 26 determining whether the number of record sets in the primary storage controller 4 cache is greater than the maximum number of record sets $R_{max}$ allowed in a single transfer. If so, control transfers to block 38; otherwise, control transfers to block 42.

Block 38 represents the operating system 26 setting the record sets to transfer in the next operation ($R_T$) equal to $R_{max}$ to allow for the maximum transfer possible. Control then transfers to block 40 which represents the operating system 26 setting the residual value to the number of record sets other than the $R_T$ record sets involved in the initial data transfer. If the number of record sets in the primary storage controller 4 cache is less than $R_{max}$ then at block 42, the operating system 26 sets the record sets to transfer, $R_T$, to the number of record sets in the cache. After $R_T$ is set at blocks 40 or 42, control transfers to block 44 which represents the operating system 26 calculating the number of pages ($P_T$) needed to handle the transfer of the $R_T$ records. $P_T$ is calculated by multiplying $R_T$ times the maximum number of pages needed for any transfer, $P_{max}$. Thus, if $P_{max}=8$ and $R_T=64$, then the number of pages $P_T$ needed to handle this transfer is 512.

After calculating $P_T$, control transfers to block 46 which represents the host system 12 determining whether there are any fixed pages in an I/O pool of pages used for I/O operations, such as copying data between the controllers 4, 6. The host system 12 would maintain a data structure indicating a pool of fixed pages available for I/O operations between the controllers 4, 6. If the I/O pool does not include fixed pages, control transfers to block 48 which represents the operating system 26 fixing $P_T$ pages and allocating such fixed pages to the data transfer operations. If there are fixed pages in the I/O pool, then control transfers to block 50, in FIG. 3b, which represents the operating system 26 determining whether the number of available fixed pages in the I/O pool is less than $P_T$. If the I/O pool does not include enough available fixed pages to accommodate the transfer of $R_T$ record sets requiring $P_T$ pages, control transfers to block 54 which represents the operating system 26 allocating all available fixed pages in the I/O pool to the transfer of the $R_T$ record sets and fixing additional pages to reach a total of $P_T$ pages to handle the transfer of the $R_T$ record sets. Otherwise, control transfers to block, 52 which represents the operating system 26 allocating the available fixed pages in the I/O pool to the transfer of the $R_T$ record sets.

After all needed pages $P_T$ have been fixed for the transfer of the $R_T$ record sets at blocks 48, 52 or 54, control transfers to block 56 which represents the operating system 26 separating the fixed pages $P_T$ allocated to the transfer into target buffers $B_T$. In preferred embodiments, each buffer accommodates the transfer of a single record set. For instance, if the transfer requires 512 pages, then these pages would be separated into 64 buffers, where each buffer is comprised of 8 pages. Control then transfers to block 58 which represents the operating system 26 reading the $R_T$ record sets involved in the transfer into the buffers $B_T$ allocated to such transfer. After reading all the $R_T$ record sets into the buffers $B_T$, control transfers to block 60 which represents the operating system 26 writing the data from the $B_T$ buffers to the secondary storage controller 6. From there the secondary storage controller 6 would write the data to the secondary DASD 10.

Control then transfers to block 62 which represents the operating system 26 releasing the fixed pages involved in the data transfer operation at blocks 58 and 60 to the I/O pool. Control transfers to block 64 which represents the host system 12 determining whether the number of fixed pages in the I/O pool and fixed pages being used in ongoing data transfer operations executing in other threads, exceeds the upper threshold of pages fixed for I/O operations. If so, control transfers to block 66 which represents the host system 12 freeing a sufficient number of available fixed pages in the I/O pool to the operating system 26 so the number of total pages involved in I/O operations does not exceed the upper threshold. Once pages are freed to the operating system 26, the operating system 26 may use such pages for other operations. If the number of pages in the I/O pool and involved in ongoing I/O operations does not exceed the upper threshold, control transfers to block 68 to terminate the logic initiated at block 30.

Figure 4:
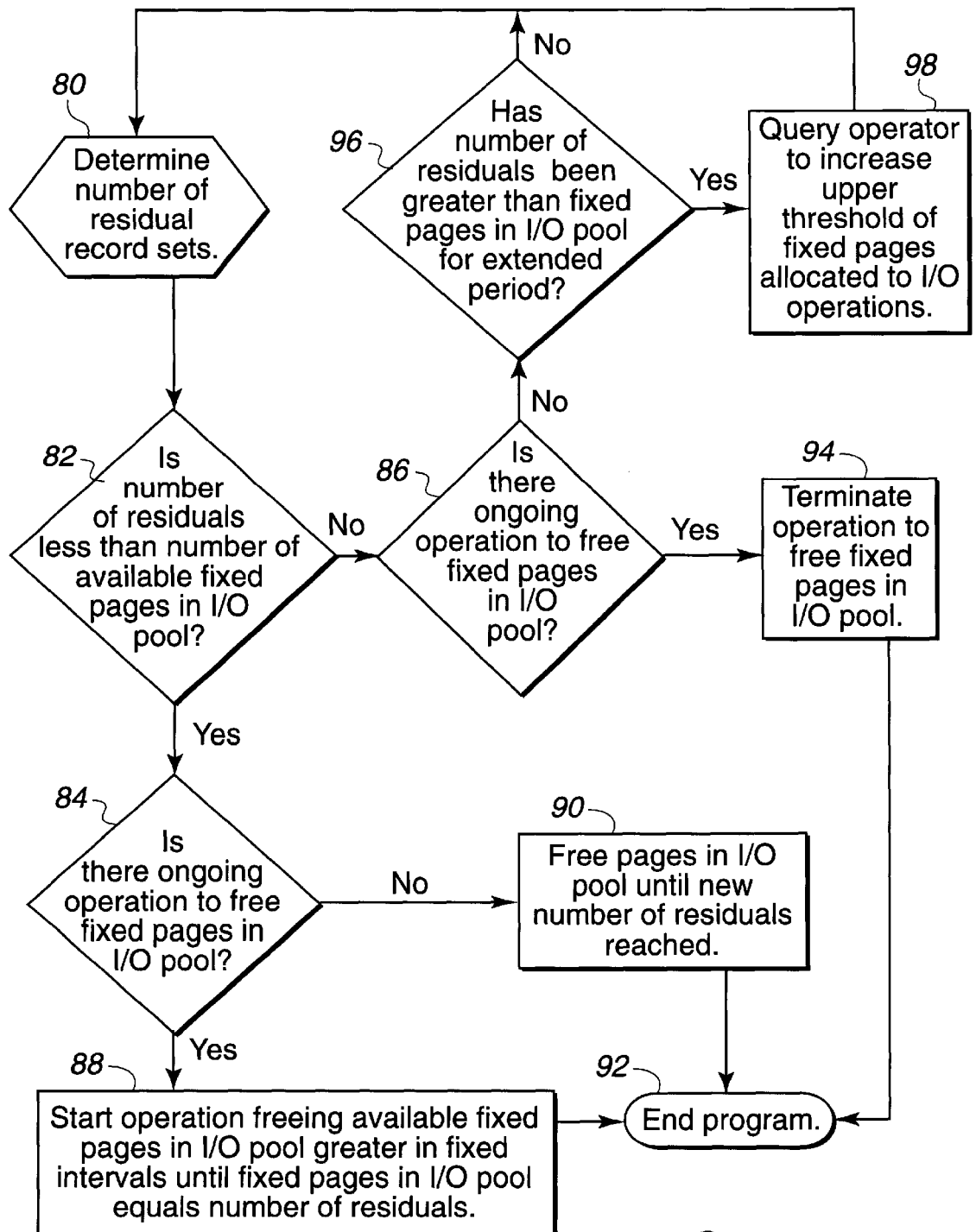
FIG. 4 is a flowchart illustrating logic to adjust the number of fixed pages available for I/O operations in response to changes in the data transfer workload in accordance with preferred embodiments of the present invention.

FIG. 4 illustrates further logic embedded in the operating system 26 or other program in the host system 12 to adjust the number of fixed pages in the I/O pool if there is a change in the workload of record sets being transferred between the primary 4 and secondary 6 storage controller. This logic frees fixed pages for use by the operating system 26 if the workload has decreased or adds fixed pages to I/O operations if the workload of record sets to copy over has increased. The logic of FIG. 4 may be implemented independently at predetermined intervals or called during the execution of the logic of FIGS. 3a, b. Control begins at block 80 which represents the host system 12 determining the number of residual record sets in the primary storage controller 4 cache to be transferred in subsequent data transfer operation. The determination of residuals may be made at block 40 in FIG. 3a or at block 42. At block 42, when the number of record sets to transfer $R_T$ is less than or equal to the maximum number of record sets that can be transferred $R_{max}$, then the residuals are zero. The number of residuals represents the workload for future data transfer operations. From block 80, control transfers to block 82 which represents the host system 12 determining whether the number of residual record sets is less than the number of available fixed pages in the I/O pool. If so, control transfers to block 84; otherwise, control transfers to block 86.

A determination that the number of residuals is less than the number of available fixed pages indicates that the workload has decreased. In such case, control transfers to block 84 which represents the host system 12 determining whether there is an ongoing operation, initiated during a previous instance of the execution of the logic of FIG. 4, to free fixed pages in the I/O pool. If there is no ongoing operation, then control transfers to block 88 which represents the host system 12 initiating an operation to free available fixed pages in the I/O pool over a period of time until the number of fixed pages in the I/O pool equals the number of residuals. If an operation to free available fixed pages w as previously initiated, then control transfers to block 90 which represents the host system 12 adjusting the target fixed page goal to reach by freeing pages to the newly calculated residual value. From blocks 88 and 90, control transfers to block 92 to end the program.

A determination, at block 82, that the number of residuals is greater than the number of available fixed pages in the I/O pool may indicate that the workload has increased to a level beyond the upper threshold of fixed pages available for I/O operations. In such case, control transfers to block 86 which represents the host system 12 determining whether an operation to free fixed pages was previously initiated at block 88 during a previous execution of the logic of FIG. 4. If so, control transfers to block 94 which represents the host system 12 terminating the operation to free fixed pages in the I/O pool. From block 94, control transfers to block 92 to terminate the current instance of the logic of FIG. 4. If there is no ongoing operation to free fixed pages, then control transfers to block 96 which represents the host system 12 determining whether the number of residuals has been greater than the fixed pages in the I/O pool for an extended period. This would indicate that the workload has been higher for such extended period. If the workload has so increased, then control transfers to block 98 which represents the host system 12 querying the operator to increase the upper threshold of fixed pages allocated to I/O operations to meet the increased workload. In this way, with the logic of FIG. 4, the upper threshold of fixed pages allocated to I/O operations may be adjusted to accommodate changes in the workload of data transfers from the primary storage controller 4 to the secondary storage controller 6.

With the preferred embodiments, pages in the pool remain fixed and available for further I/O operations. The preferred embodiments thus avoid the overhead of having to fix and free pages for each I/O operation. The preferred embodiments reduce such overhead by taking a pool of fixed pages away from other operating system operations. However, the preferred embodiments provide mechanisms to minimize the number of fixed pages in the I/O pool that are removed from other operating system operations.

With preferred embodiments, the operating system can address the real address of the fixed pages with virtual addresses. However, the operating system does not need to take the extra steps of fixing pages and acquiring real page memory space for the data involved in the transfer.

The preferred embodiments improve performance over prior art systems by leaving buffers of pages fixed across I/O operations, thereby reducing system resources devoted to fixing and freeing the pages between input/output operations.

The preferred embodiments, including the preferred logic of FIGS. 3a, b and 4 may be implemented as a method, apparatus or article of manufacture using standard programming and/or engineering techniques to produce software, firmware, hardware, or any combination thereof. The term "article of manufacture"(or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Conclusion

This concludes the description of the preferred embodiments of the invention. The following describes some alternative embodiments for accomplishing the present invention.

In preferred embodiments the logic of FIGS. 3a, b is implemented in the operating system 26 of the host system 12. In alternative embodiments, some or all of the logic of FIGS. 3a, b may be implemented in application programs within the host system 12, the primary storage controller 4, and/or the secondary 6 storage controller.

In Preferred embodiments were described with respect to an XRC type data transfer operation where data is transferred from one controller to another through a host system. However, the preferred embodiments can apply to data transfer operations other than the XRC type operation, such as PPRC type operations, or any other I/O operation known in the art. Those skilled in the art will appreciate that the preferred embodiments may be applied to numerous embodiments where I/O operations are buffered in memory as data is transferred between locations. Such locations may be in storage areas within a single system or at separate systems such as with the described embodiments.

Values and information used by the host system 12 in fixing pages for data transfer operations in accordance with preferred embodiments of the present invention, such as $P_{max}$, $R_{max}$, $R_T$, $P_T$, residual value, etc., may be maintained as fields in data structures in a memory area within the host system 12.

In summary, preferred embodiments disclose a system for managing pages in a volatile memory device for data transfer operations between a first storage area and a second storage area. The first storage area is queried to determine a number of data sets to include in a data transfer operation. A number of pages in the volatile memory device needed for the data transfer operation is then determined. A determination is then made as to whether the number of pages needed for the data transfer operation is greater than available fixed pages in a pool of pages. Available fixed pages in the pool are allocated to the data transfer operation after determining that the number of pages needed to process the data transfer operation is less than or equal to the available fixed pages in the pool. Alternatively, after determining that the number of pages needed to process the data transfer operation is greater than the available fixed pages in the pool, all the fixed pages in the pool and additional fixed pages are allocated to the data transfer operation.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing pages in a volatile memory device for data transfer operations between a first storage area and a second storage area, comprising:

querying the first storage area to determine a number of data sets to include in a data transfer operation;

determining a number of pages in the volatile memory device needed for the data transfer operation;

determining whether the number of pages needed for the data transfer operation is greater than available fixed pages in a pool of pages;

allocating available fixed pages in the pool to the data transfer operation after determining that the number of pages needed to process the data transfer operation is less than or equal to the available fixed pages in the pool;

allocating all the fixed pages in the pool to the data transfer operation and fixing additional pages to allocate to the data transfer operation after determining that the number of pages needed to process the data transfer operation is greater than the available fixed pages in the pool; and releasing the fixed pages, including the fixed additional pages, to the pool to be available for a subsequent data transfer operation.

2. The method of claim 1, further comprising:

reading the data sets from the first storage area to the fixed pages allocated to the data transfer operation;

writing the data sets from the fixed pages to the second storage area, wherein the allocated fixed pages are released to the pool including available fixed pages after writing the data sets to the second storage area.

3. The method of claim 2, wherein the first storage area is managed by a first processing unit, wherein the second storage area is managed by a second processing unit, wherein the step of reading the data comprises the first processing unit accessing the data sets in the first storage area and transferring the data sets to the fixed pages, and wherein the step of writing the data sets comprises communicating the data sets to the second processing unit which writes the data sets to the second storage area.

4. The method of claim 1, further comprising the steps of:

providing an upper threshold of fixed pages available for data transfer operations;

determining whether the number of fixed pages available for data transfer operations exceeds the upper threshold; and freeing fixed pages available in the pool after determining that the number of fixed pages available for data transfer operations exceeds the upper threshold.

5. The method of claim 4, wherein the step of determining the number of fixed pages available for data transfer operations comprises determining the total of the number of fixed pages involved in ongoing data transfer operations and the number of fixed pages available in the pool.

6. The method of claim 1, wherein a maximum transfer value indicates a maximum number of data sets to include in a data transfer operation, wherein the step of querying the first storage area to determine the number of data sets to include in the data transfer operations comprises the steps of:

determining whether the number of data sets identified in the querying of the first storage area exceeds the maximum transfer value;

including all the data sets identified in the querying of the first storage area in the data transfer operation after determining that the number of data sets identified in the first storage area is less than or equal to the maximum transfer value;

performing, after determining that the number of data sets identified in the first storage area is greater than the maximum transfer value, the steps of:

(i) including the maximum transfer value of data sets identified in the querying of the first storage area in the data transfer operation; and (ii) calculating a residual value indicating a number of data sets identified in the querying operation not included in the data transfer operation.

7. The method of claim 6, further comprising the steps of:

determining whether the residual value is less than the number of available fixed pages in the pool; and initiating an operation to free fixed pages in the pool after determining that the residual value is less than the number of available fixed pages in the pool.

8. The method of claim 6, further comprising the steps of:

determining whether the residual value is greater than the number of available fixed pages in the pool; and querying an operator to increase the upper threshold after determining that the residual value has been greater than the number of available fixed pages in the pool for a period of time.

9. The method of claim 1, wherein the step of determining the number of pages needed to process the data transfer operation comprises the step of multiplying the number of data sets included in the data transfer operation times a number of pages allocated for each data set included in the data transfer operation.

10. The method of claim 1, wherein the pool of pages are comprised of fixed pages dedicated to data transfer operations.

11. system for managing pages used in data transfer operations, comprising:

a first storage area including data sets to include in a data transfer operation;

a second storage area;

a volatile memory device;

a processing unit operating under control of executable program logic and in communication with the first storage area, the second storage area, and the volatile memory device, including:

(i) means for determining a number of pages in the volatile memory device needed for the data transfer operation;

(ii) means for determining whether the number of pages needed for the data transfer operation is greater than available fixed pages in a pool of pages;

(iii) means for allocating available fixed pages in the pool to the data transfer operation after determining that the number of pages needed to process the data transfer operation is less than or equal to the available fixed pages in the pool;

(iv) means for allocating all the fixed pages in the pool to the data transfer operation and fixing additional pages to allocate to the data transfer operation after determining that the number of pages needed to process the data transfer operation is greater than the available fixed pages in the pool; and (v) means for releasing the fixed pages, including the fixed additional pages, to the pool to be available for a subsequent data transfer operation.

12. The system of claim 11, wherein the program logic further includes:

means for reading the data sets from the first storage area to the fixed pages allocated to the data transfer operation;

means for writing the data sets from the fixed pages to the second storage area wherein the allocated fixed pages are released to the pool including available fixed pages after writing the data sets to the second processing unit.

13. The system of claim 12, wherein the processing unit is a host processing unit, further including:

a first processing unit controlling access to the first storage area;

a second processing unit controlling access to the second storage area;

a host system including the volatile memory device, the host processing unit, and the executable program logic; and a network communication line providing communication between the host system and the first processing unit and the second processing unit, wherein the means for reading comprises the host system requesting the first processing unit for the data sets in the first storage area, and wherein the means for writing the data sets comprises the host system communicating the data sets to the second processing unit which writes the data sets to the second storage area.

14. The system of claim 11, wherein the processing unit further includes:

means for providing an upper threshold of fixed pages available for data transfer operations;

means for determining whether the number of fixed pages available for data transfer operations exceeds the upper threshold; and means for freeing the fixed pages available in the pool after determining that the number of fixed pages available for data transfer operations exceeds the upper threshold.

15. The system of claim 11, wherein the processing unit further includes means for providing a maximum transfer value indicating a maximum number of data sets to include in a data transfer operation, wherein the means for querying the first storage area to determine the number of data sets to include in the data transfer operations comprises:

means for determining whether the number of data sets identified in the querying of the first storage area exceeds the maximum transfer value;

means for including all the data sets identified in the querying of the first storage area in the data transfer operation after determining that the number of data sets identified in the first storage area is less than or equal to the maximum transfer value; and means for including the maximum transfer value of data sets identified in the querying of the first storage area in the data transfer operation and calculating a residual value indicating a number of data sets identified in the querying operation not included in the data transfer operation after determining that the number of data sets identified in the first storage area is greater than the maximum transfer value.

16. The system of claim 15, wherein the program logic further includes:

means for determining whether the residual value is less than the number of available fixed pages in the pool; and means for initiating an operation to free fixed pages in the pool after determining that the residual value is less than the number of available fixed pages in the pool.

17. The system of claim 15, wherein the program logic further comprises:

means for determining whether the residual value is greater than the number of available fixed pages in the pool; and means for querying an operator to increase the upper threshold after determining that the residual value has been greater than the number of available fixed pages in the pool for a period of time.

18. An article of manufacture for use in programming a processing unit to manage pages in a volatile memory device for data transfer operations between a first storage area and a second storage area, the article of manufacture comprising at least one computer readable storage device including at least one computer program embedded therein that causes the processing unit to perform:

querying the first storage area to determine a number of data sets to include in a data transfer operation;

determining a number of pages in the volatile memory device needed for the data transfer operation;

determining whether the number of pages needed for the data transfer operation is greater than available fixed pages in a pool of pages;

allocating available fixed pages in the pool to the data transfer operation after determining that the number of pages needed to process the data transfer operation is less than or equal to the available fixed pages in the pool;

allocating all the fixed pages in the pool to the data transfer operation and fixing additional pages to allocate to the data transfer operation after determining that the number of pages needed to process the data transfer operation is greater than the available fixed pages in the pool; and releasing the fixed pages, including the fixed additional pages, to the pool to be available for a subsequent data transfer operation.

19. The article of manufacture of claim 18, further causing the processing unit to perform:

reading the data sets from the first storage area to the fixed pages allocated to the data transfer operation;

writing the data sets from the fixed pages to the second storage area, wherein the allocated fixed pages are released to the pool including available fixed pages after writing the data sets to the second storage area.

20. The article of manufacture of claim 19, wherein the processing unit is a host processing unit, wherein the first storage area is managed by a first processing unit, wherein the second storage area is managed by a second processing unit, wherein the step of causing the host processing unit to read the data comprises the host processing unit requesting the first processing unit to transfer the data sets in the first storage area, and wherein the step of writing the data sets comprises the host processing unit communicating the data sets to the second processing unit which writes the data sets to the second storage area.

21. The article of manufacture of claim 18, further causing the processing unit to perform the steps of:

providing an upper threshold of fixed pages available for data transfer operations;

determining whether the number of fixed pages available for data transfer operations exceeds the upper threshold; and freeing fixed pages available in the pool after determining that the number of fixed pages available for data transfer operations exceeds the upper threshold.

22. The article of manufacture of claim 21, wherein the step of determining the number of fixed pages available for data transfer operations comprises causing the processing unit to perform the steps of determining the total of the number of fixed pages involved in ongoing data transfer operations and the number of fixed pages available in the pool.

23. The article of manufacture of claim 18, wherein a maximum transfer value indicates a maximum number of data sets to include in a data transfer operation, wherein the step of causing the processing unit to query the first storage area to determine the number of data sets to include in the data transfer operations comprises causing the processing unit to perform the steps of:

determining whether the number of data sets identified in the querying of the first storage area exceeds the maximum transfer value;

including all the data sets identified in the querying of the first storage area in the data transfer operation after determining that the number of data sets identified in the first storage area is less than or equal to the maximum transfer value;

after determining that the number of data sets identified in the first storage area is greater than the maximum transfer value, performing the steps of:
  (i) including the maximum transfer value of data sets identified in the querying of the first storage area in the data transfer operation; and
  (ii) calculating a residual value indicating a number of data sets identified in the querying operation not included in the data transfer operation.

24. The article of manufacture of claim 23, further causing the processing unit to perform the steps of:

determining whether the residual value is less than the number of available fixed pages in the pool; and initiating an operation to free fixed pages in the pool after determining that the residual value is less than the number of available fixed pages in the pool.

25. The article of manufacture of claim 23, further causing the processing unit to perform the steps of:

determining whether the residual value is greater than the number of available fixed pages in the pool; and querying an operator to increase the upper threshold after determining that the residual value has been greater than the number of available fixed pages in the pool for a period of time.

26. The article of manufacture of claim 18, wherein the step of determining the number of pages needed to process the data transfer operation comprises causing the processing unit to multiply the number of data sets included in the data transfer operation times a number of pages allocated for each data set included in the data transfer operation.

27. A memory location for storing at least one data structure for access by a processing unit, wherein the processing unit accesses a volatile memory device and is in communication with a first storage area and a second storage area, the data structures comprising:

a first field indicating data sets in the first storage area to include in a data transfer operation from the first storage area to the second storage area;

a second field indicating a number of pages in the volatile memory device needed for the data transfer operation;

a third field indicating a pool of fixed pages available for data transfer operations; and a fourth field indicating fixed pages in the volatile memory device allocated to the data transfer operation, wherein available fixed pages in the pool are allocated to the data transfer operation after determining that the number of pages needed to process the data transfer operation is less than or equal to the available fixed pages in the pool, wherein all the fixed pages in the pool are allocated to the data transfer operation and additional pages are fixed and allocated to the data transfer operation after determining that the number of pages needed to process the data transfer operation is greater than the available fixed pages in the pool, and wherein the fixed pages are released, including the fixed additional pages, to the pool to be available for a subsequent data transfer operation.

28. The memory of claim 27, wherein the data sets in the data transfer operation are read from the first storage area to the fixed pages allocated to the data transfer operation, and wherein the data sets from the fixed pages are communicated to the second storage area, and wherein the third field is modified to indicate that the fixed pages used in the data transfer operation are in the pool after writing the data sets to the second storage area and after releasing the allocated fixed pages to the pool.

29. The memory of claim 27, wherein the data structure further includes:

a fifth field indicating an upper threshold of fixed pages available for data transfer operations; and a sixth field indicating the number of fixed pages available for data transfer operations, wherein fixed pages available in the pool are freed after determining that the number of fixed pages available for data transfer operations exceeds the upper threshold.

30. The memory of claim 29, wherein the data in the sixth field is determined by totaling the number of fixed pages involved in ongoing data transfer operations and the number of fixed pages available in the pool.

31. The memory of claim 27, wherein the data structure further comprises:

a fifth field including a maximum transfer value indicating a maximum number of data sets to include in a data transfer operation, wherein the data sets indicated in the first field to include in the data transfer operations includes all the data sets in the first storage area when the number of data sets in the first storage area is less than or equal to the maximum transfer value, and wherein the data sets indicated in the first field to include in the data transfer operations includes the maximum transfer value of data sets identified in the querying of the first storage area; and a sixth field including a residual value indicating a number of data sets in the first storage area not included in the data transfer operation.

32. The memory of claim 31, wherein an operation to free fixed pages indicated in the pool is initiated after determining that the residual value indicated in the sixth field is less than the number of available fixed pages in the pool indicated in the third field.

33. The memory of claim 31, wherein an operator is queried to increase the upper threshold after determining that the residual value has been greater than the number of available fixed pages in the pool indicated in the third data field for a period of time.

34. The memory of claim 27, wherein the data structures further include a fifth field indicating a number of pages allocated for each data set included in the data transfer operation, wherein the number of pages indicated in the second field is determined by multiplying the number of data sets included in the data transfer operation as indicated in the first field times the number of pages allocated for each data set as indicated in the fifth field.

* * * * *

UNITED STATES PATENT AND TRADEMARK OFFICE
CERTIFICATE OF CORRECTION

PATENT NO. : 6,260,129 B1
DATED : July 10, 2001
INVENTOR(S) : Robert Nelson Crockett et al.

It is certified that error appears in the above-identified patent and that said Letters Patent is hereby corrected as shown below:

<u>Title page,</u>
Item [56], References Cited, please insert:
-- U.S. PATENT DOCUMENTS

| | | |
|---|---|---|
| 4437155 | 3/84 | Sawyer et al. |
| 4458316 | 7/84 | Fry et al. |
| 4468730 | 8/84 | Dodd et al. |
| 4489378 | 12/84 | Dixon et al. |
| 4490782 | 12/84 | Dixon et al. |
| 4533995 | 8/85 | Christian et al. |
| 4583166 | 4/86 | Hartung et al. |
| 4603382 | 7/86 | Iskiyan et al. |
| 4882642 | 11/89 | Tayler et al. |
| 4956803 | 9/90 | Tayler et al. |
| 4979108 | 12/90 | Crabbe, Jr. |
| 5134563 | 7/92 | Tayler et al. |
| 5263145 | 11/93 | Brady et al. |
| 5297265 | 3/94 | Frank et al. |
| 5426761 | 6/95 | Cord et al. |
| 5432919 | 7/95 | Falcone et al. |
| 5432932 | 7/95 | Chen et al. |
| 5434992 | 7/95 | Mattson |
| 5440686 | 8/95 | Dahman et al. |
| 5440727 | 8/95 | Bhide et al. |
| 5446871 | 8/95 | Shomler et al. |
| 5481691 | 1/96 | Day, III, et al. |
| 5504861 | 4/96 | Crockett, et al. |
| 5551003 | 8/96 | Mattson et al. |
| 5574950 | 11/96 | Hathorn et al. |
| 5590308 | 12/96 | Shih |
| 5592618 | 1/97 | Micka et al. |
| 5606688 | 2/97 | McNutt et al. |
| 5623599 | 4/97 | Shomler |
| 5623608 | 4/97 | Ng |
| 5627990 | 5/97 | Cord et al. |
| 5636359 | 6/97 | Beardsley et al. |
| 5651136 | 7/97 | Denton et al. |
| 6141731 | 10/02 | Beardsley et al. |
| 6327644 | 12/01 | Beardsley et al. |
| 6381677 | 4/02 | Beardsley et al. -- |

UNITED STATES PATENT AND TRADEMARK OFFICE
CERTIFICATE OF CORRECTION

PATENT NO. : 6,260,129 B1
DATED : July 10, 2001
INVENTOR(S) : Robert Nelson Crockett et al.

It is certified that error appears in the above-identified patent and that said Letters Patent is hereby corrected as shown below:

Title page (cont'd),
FOREIGN PATENT DOCUMENTS, please insert
-- EPO     0674263   2/1995
   JAPAN   6052060   2/1994 --
OTHER PUBLICATIONS, please insert Improving Most Recently User Change Prefetching, IBM Technical Disclosure Bulletin, Vol. 36, No. 08, August 1993
Optimized Look-Ahead Extension on Sequential Access, IBM Technical Disclosure Bulletin, Vol. 39, No. 11, November 1996
Direct Access Storage Device Cache Segment Management, IBM Technical Disclosure Bulletin, Vol. 37, No. 08, August 1994
Cache System for Hard Disk System Utilizing the Access Data Address, IBM Technical Disclosure Bulletin, Vol. 38, No. 01, January 1995
Direct Memory Access Paging and Remote DRAM Access Through an Optimized Memory Mapping Mechanism, IBM Technical Disclosure Bulletin, Vol. 38, No. 06, June 1995
Non-Volatile Cache Storage Allocation Algorithm, IBM Technical Disclosure Bulletin, Vol. 38, No. 12, December 1995
Fixed Storage Allocation of Input-Output Buffers, IBM Technical Disclosure Bulletin, Vol. 39, No. 03, March 1996
Remote Copy Administrator's Guide and Reference, DFSMS/MVS Version 1, Third Edition, July 1996, IBM Doc. No. SC35-0169-02
Pinter and Yoaz; Tango: a Hardware-based Data Prefetching Technique for Superscalar Processors; Proceedings of the 29th Annual IEEE/ACM International Symposium on Microarchitecture MICRO-29, Dec. 2-4, 1996, Paris France.
Patterson, et al.; Informed Prefetching and Caching; Proceedings of the 15th ACM Symposium on Operating Systems Principles, Dec. 3-6, 1995, Copper Mountain Resort, Colorado
Tomkins et al; Informed Multi ProcessPrefetching and Caching; Performance Evaluation Review Special Issue, Vol. 25, No. 1, June 1997 – 1997 ACM Sigmetrics Interantional Conference on Measurement and Modeling of Computer Systems
Patterson and Gibson; Exposing I/O Concurrency with Informed Prefetching; Proceedings of the Third International Conference on Parallel and Distributed Information Systems, Sept. 28-30, 1994, Austin, Texas
Shih, et al.; A File-Based Adaptive Prefetch Caching Design; Proceedings, 1990 IEEE International Conference on Computer Design: VLSI in Computers and Processors, Sept. 17-19, 1990, Hyatt Regency Cambridge, Cambridge, MA
King, et al.; Management of a Remote Backup Copy for Disaster Recovery; ACM Transactions on Database Systems, Vol. 16, No. 2, June 1991, pages 338-368
Fixed Storage Allocation of Input-Output Buffers, IBM Technical Disclosure Bulletin, Vol. 39, No. 03, March 1996
Remote Copy Administrator's Guide and Reference, DFSMS/MVS Version 1, Third Edition, July 1996 IBM Column 9,
Line 5, delete "In"

UNITED STATES PATENT AND TRADEMARK OFFICE
CERTIFICATE OF CORRECTION

PATENT NO. : 6,260,129 B1
DATED : July 10, 2001
INVENTOR(S) : Robert Nelson Crockett et al.

It is certified that error appears in the above-identified patent and that said Letters Patent is hereby corrected as shown below:

Column 11,
Line 24, before "system" insert -- A --

Signed and Sealed this

Fifth Day of April, 2005

JON W. DUDAS
*Director of the United States Patent and Trademark Office*